United States Patent
Cui et al.

(10) Patent No.: US 11,237,728 B2
(45) Date of Patent: *Feb. 1, 2022

(54) METHOD FOR ACCESSING EXTENDED MEMORY, DEVICE, AND SYSTEM

(71) Applicant: Huawei Technologies Co., Ltd., Shenzhen (CN)

(72) Inventors: Zehan Cui, Beijing (CN); Mingyu Chen, Beijing (CN); Yao Liu, Beijing (CN); Yuan Ruan, Beijinig (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

This patent is subject to a terminal disclaimer.

(21) Appl. No.: 16/744,795

(22) Filed: Jan. 16, 2020

(65) Prior Publication Data

US 2020/0150872 A1 May 14, 2020

Related U.S. Application Data

(63) Continuation of application No. 15/788,990, filed on Oct. 20, 2017, now Pat. No. 10,545,672, which is a (Continued)

(30) Foreign Application Priority Data

Apr. 23, 2015 (CN) .......................... 201510198452.X

(51) Int. Cl.
*G06F 3/06* (2006.01)
*G06F 12/06* (2006.01)
(Continued)

(52) U.S. Cl.
CPC ............. *G06F 3/0608* (2013.01); *G06F 3/06* (2013.01); *G06F 3/065* (2013.01); *G06F 3/0619* (2013.01);
(Continued)

(58) Field of Classification Search
CPC ............. G06F 12/0215; G06F 12/0292; G06F 12/0623; G06F 12/0859; G06F 13/1673;
(Continued)

(56) References Cited

U.S. PATENT DOCUMENTS

| 5,404,477 A | 4/1995 | Jippo |
| 10,545,672 B2* | 1/2020 | Cui ..................... G06F 12/0292 |

(Continued)

FOREIGN PATENT DOCUMENTS

| CN | 101089828 A | 12/2007 |
| CN | 12609378 A | 7/2012 |

(Continued)

OTHER PUBLICATIONS

Cooper-Balis, E., et al., "Buffer-on-board memory systems", Computer Architecture (ISCA), P012 39th Annual International Symposium on, IEEE, Jun. 9, 2012, XP032200050, 12 pages.

(Continued)

*Primary Examiner* — Zhuo H Li
(74) *Attorney, Agent, or Firm* — Conley Rose, P.C.

(57) ABSTRACT

In a method for accessing an extended memory, after receiving a first memory access request from a processor system in a computer, an extended memory controller sends a read request for obtaining to-be-accessed data to the extended memory and return, to the processor system, a first response message indicating the to-be-accessed data has not been obtained. The extended memory controller writes the to-be-accessed data into a data buffer after receiving the to-be-accessed data returned by the extended memory. After receiving, from the processor system, a second memory access request comprising a second access address, the extended memory controller returns, to the processor system, the to-be-accessed data in the data buffer in response to the second memory access request, wherein the second (Continued)

access address is different from the first access address and points to the physical address of the to-be-accessed data.

20 Claims, 9 Drawing Sheets

Related U.S. Application Data continuation of application No. PCT/CN2016/073304, filed on Feb. 3, 2016.

(51) Int. Cl.
  *G06F 13/16* (2006.01)
  *G06F 13/42* (2006.01)
  *G06F 12/02* (2006.01)

(52) U.S. Cl.
  CPC ........ *G06F 3/0656* (2013.01); *G06F 12/0623* (2013.01); *G06F 13/1673* (2013.01); *G06F 13/1689* (2013.01); *G06F 13/1694* (2013.01); *G06F 13/4234* (2013.01); *G06F 12/0215* (2013.01); *G06F 2212/1008* (2013.01); *G06F 2212/1024* (2013.01); *G06F 2213/0064* (2013.01)

(58) Field of Classification Search
  CPC ............. G06F 13/1689; G06F 13/1694; G06F 13/4234; G06F 2212/1008; G06F 2212/1024; G06F 2212/7201; G06F 2212/7203; G06F 2213/0064; G06F 3/06; G06F 3/0608; G06F 3/0619; G06F 3/065; G06F 3/0656; G06F 12/0246; G06F 12/06
  See application file for complete search history.

(56) References Cited

U.S. PATENT DOCUMENTS

| | | |
|---|---|---|
| 2002/0023197 A1 | 2/2002 | Miura et al. |
| 2003/0225971 A1 | 12/2003 | Oishi et al. |
| 2004/0268040 A1 | 12/2004 | Bum et al. |
| 2010/0030980 A1 | 2/2010 | Takashi et al. |
| 2011/0010494 A1 | 1/2011 | Kazuhito et al. |
| 2012/0011386 A1 | 1/2012 | Natarajan et al. |
| 2014/0195764 A1 | 7/2014 | Jian et al. |
| 2015/0006841 A1 | 1/2015 | Chen et al. |
| 2015/0113198 A1 | 4/2015 | Li et al. |

FOREIGN PATENT DOCUMENTS

| | | |
|---|---|---|
| CN | 104388436 A | 1/2014 |
| CN | 104346293 A | 2/2015 |
| CN | 104375946 A | 2/2015 |
| JP | 2003186740 A | 7/2003 |
| JP | 2004234461 A | 8/2004 |
| JP | 2011118501 A | 6/2010 |
| JP | 2010250727 A | 11/2010 |
| JP | 2013069210 A | 4/2013 |
| WO | 2008084681 A1 | 7/2008 |
| WO | 2009125572 A1 | 10/2009 |

OTHER PUBLICATIONS

Cui, Z., et al., Twin-Load:Building a Scalable Memory System over the Non-Scalable Interfacen, ARXIV. pRG, Cornell University Library, 201 Olin Library Cornell University Ithaca. NY14853, XP080792942, May 13, 2015, 12 pages.

Cui, Z., et al., "Twin-Load", Memory Systems, ACM, 2 Penn Plaza, Suite 701 New York NY 10121-0701 USA, XP058300038, Oct. 3, 2016, 14 pages.

Chen, M., et al., "Studies of Key Technology on Message-based Memory System," Journal of Network New Media, Apr. 16, 2013, 1 page.

Chen, L., et al., "An Approach for Monitoring Memory Address Traces with Functional Semantic Information,".

* cited by examiner

Remarks
RD: a read command
Data: data that is read

Remarks:
ACT: an activate instruction;
RD: a read instruction;
PRE: a pre-charge instruction;
Bank row: a bank address and a row address;
Bank col: a bank address and a column address;
Bank: a bank address

METHOD FOR ACCESSING EXTENDED MEMORY, DEVICE, AND SYSTEM

CROSS-REFERENCE TO RELATED APPLICATIONS

This is a continuation of U.S. patent application Ser. No. 15/788,990 filed on Oct. 20, 2017, which is a continuation of Int'l Patent App. No. PCT/CN2016/073304 filed on Feb. 3, 2016, which claims priority to Chinese Patent App. No. 201510198452.X filed on Apr. 23, 2015, which are incorporated by reference.

TECHNICAL FIELD

The present disclosure relates to the computer field, and in particular, to a method for accessing an extended memory, a device, and a system.

BACKGROUND

Application of big data has a higher requirement for a computer processing capability. An important indicator of improving the computer processing capability is an improvement of a memory capacity. In an application scenario, because of a limited integration level of an existing memory chip, multiple memory chips are connected by using an extension chip, so as to expand the memory capacity. In another application scenario, an application acceleration chip is added to more computer systems to perform acceleration processing on some specific applications. For example, a graphics processing unit (GPU) is usually used for acceleration during processing of graphical and image data. Generally, such an application acceleration chip may be implemented by using an application-specific integrated circuit (ASIC) or a field-programmable gate array (FPGA).

The foregoing two application scenarios may be described based on FIG. 1. A processor system 101, a system memory 102, a memory extension chip 103, and an extended memory 104 are included in FIG. 1, and a memory controller 1011 is integrated into the processor system 101. The system memory 102 is connected to the processor system 101 by using a memory bus, the extended memory 104 is connected to the memory extension chip 103 by using the memory bus, and the processor system 101 may be connected to the memory extension chip 103 through the memory controller 1011 in multiple manners.

In a first existing technology, an implementation manner is to use an input/output (I/O) bus to connect the processor system 101 and the memory extension chip 103. A commonly used I/O bus includes a Peripheral Component Interconnect Express (PCI-E) bus, an Intel Quick Path Interconnect (QPI) bus, or an AMD HyperTransport (HT) bus. By using the I/O bus, there is a relatively high delay, and refined pipeline design is required for the memory extension chip 103, so as to compensate for a data access delay.

In a second existing technology, an implementation manner is to use a memory bus to connect the processor system 101 and the memory extension chip 103. The use of the memory bus enables the memory extension chip 103 and the processor system 101 to directly share the extended memory 104, so that a memory access delay is relatively small.

The technical means in the second existing technology has the following problems: Because there is the memory extension chip 103 between the processor system 101 and the extended memory 104, after the processor system 101 sends a memory access request for accessing data in the extended memory 104, when the integrated memory controller 1011 receives the memory access request and accesses the extended memory 104 by using a double data rate (DDR) protocol, an extra delay is caused by existence of the memory extension chip 103. Consequently, a processing result of the memory access request cannot be returned within a delay required by the DDR protocol, and feasibility of accessing the extended memory 104 by the foregoing computer system is affected.

To resolve the foregoing delay problem, a manner of modifying a time sequence parameter of a memory controller is used, that is, the time sequence parameter of the memory controller integrated into a processor is modified, so that the time sequence parameter of the processor is greater than an actual memory access delay. However, because the processor supports a limited setting range of a maximum time sequence parameter, it is difficult to compensate for an extra access delay in a process of accessing an extended memory.

SUMMARY

Based on the foregoing problem, embodiments of the present disclosure provide a method for accessing an extended memory, a device, and a system, so as to effectively resolve a problem that a delay in a process of accessing the extended memory cannot be compensated for.

A first aspect of the embodiments of the present disclosure provides a method for accessing an extended memory by a computer, where a processor system in the computer is connected to an extended memory system by using a memory bus, the extended memory system includes an extended memory controller and the extended memory, and when the processor system in the computer needs to access to-be-accessed data stored in the extended memory, the method includes: receiving, by the extended memory controller, N+1 memory access requests serially sent by the processor system in the computer, where access addresses included in all the memory access requests are different from each other and point to a same physical address, the physical address is a storage address of the to-be-accessed data in the extended memory, N≥1, and N is an integer; determining, by the extended memory controller when receiving a first memory access request of the N+1 memory access requests, the physical address according to the access address carried in the first memory access request, sending, to the extended memory, a read request for obtaining the to-be-accessed data, and returning a specific response message to the processor system, where the read request includes the physical address; before receiving the to-be-accessed data returned by the extended memory, each time another memory access request after the first memory access request of the N+1 memory access requests is received, returning, by the extended memory controller, a specific response message to the processor system within an access delay specified in a memory bus protocol; writing, by the extended memory controller after receiving the to-be-accessed data returned by the extended memory, the to-be-accessed data into a data buffer, and stopping returning a specific response message to the processor system; and reading, by the extended memory controller when receiving another memory access request of the N+1 memory access requests, the to-be-accessed data from the data buffer, and returning the to-be-accessed data to the processor system.

With reference to the first aspect, in a first possible implementation manner, the access addresses in all the N+1 memory access requests include a same bank address and different row addresses.

With reference to the first aspect and the first possible implementation manner of the first aspect, in a second possible implementation manner, the method further includes presetting, by the extended memory controller, a mapping relationship between the access addresses included in all the N+1 memory access requests and the physical address of the to-be-accessed data in the extended memory; and the determining, by the extended memory controller, the physical address according to the access address carried in the first memory access request includes querying, by the extended memory controller, the mapping relationship according to the access address carried in the first memory access request, so as to obtain the physical address.

With reference to the second possible implementation manner of the first aspect, in a third possible implementation manner, after the determining, by the extended memory controller, the physical address according to the access address carried in the first memory access request, the method further includes: creating, by the extended memory controller, a record in the data buffer, where the record includes a tag field and a data field, and setting the tag field to the physical address.

With reference to the third possible implementation manner of the first aspect, in a fourth possible implementation manner, the record further includes a validity field, and the method further includes setting, by the extended memory controller, the validity field to invalid.

With reference to the fourth possible implementation manner of the first aspect, in a fifth possible implementation manner, each time another memory access request after the first memory access request of the N+1 memory access requests is received, the method further includes: querying, by the extended memory controller, the mapping relationship according to the access addresses carried in all the memory access requests, so as to obtain the physical address; and querying the record in the data buffer according to the physical address, and when determining that the validity field in the record is invalid, generating the specific response message.

With reference to the fourth possible implementation manner of the first aspect, in a sixth possible implementation manner, the writing, by the extended memory controller after receiving the to-be-accessed data returned by the extended memory, the to-be-accessed data into a data buffer includes: searching, by the extended memory controller, the data buffer for the record corresponding to the physical address, setting the data field in the record to the to-be-accessed data, and setting the validity field to valid.

A second aspect of the embodiments of the present disclosure provides a method for accessing an extended memory, where a processor system in a computer is connected to an extended memory system by using a memory bus, the extended memory system includes an extended memory controller and the extended memory, and when the processor system in the computer needs to access to-be-accessed data stored in the extended memory, the method includes: receiving, by the processor system, a storage address of the to-be-accessed data; generating, by the processor system, N+1 memory access requests according to the storage address of the to-be-accessed data, where access addresses included in the N+1 memory access requests are different from each other and point to a same physical address, the physical address is the storage address of the to-be-accessed data in the extended memory, $N \geq 1$, and N is an integer; and sending, by the processor system, the N+1 memory access requests to the extended memory controller.

With reference to the second aspect, in a first possible implementation manner, before the generating, by the processor system, N+1 memory access requests according to the storage address of the to-be-accessed data, the method further includes: determining a value N according to a delay parameter for obtaining data from the extended memory by the computer, where the delay parameter for obtaining data from the extended memory by the computer includes any one or any combination of the following parameters: a delay tPD1 of transmitting the memory access request from the extended memory controller to the extended memory, a delay tPD2 of transmitting data, which is read by the memory access request, from the extended memory to the extended memory controller, or a time interval T_Interval between two consecutive memory access requests sent by the processor system.

With reference to the first possible implementation manner of the second aspect, in a second possible implementation manner, the determining a value N according to a delay parameter for obtaining data from the extended memory by the computer includes determining the value N, where $N \geq [(tPD1+tPD2)/T\_Interval]$, and [*] is a rounding function.

With reference to the first possible implementation manner and the second possible implementation manner that are of the second aspect, in a third possible implementation manner, the time interval T_Interval between two consecutive memory access requests is tGAP min=tRCD+tRTP+tRP or T_Fence (that is, a delay for executing a Fence instruction by a processor).

With reference to the second aspect, the first possible implementation manner of the second aspect, the second possible implementation manner of the second aspect, and the third possible implementation manner of the second aspect, in a fourth possible implementation manner, the generating, by the processor system, N+1 memory access requests according to the storage address of the to-be-accessed data includes: performing a virtual-to-physical address conversion according to the storage address Addr_Virtual of the to-be-accessed data, where the storage address of the to-be-accessed data is the virtual address, so as to obtain a physical address Addr_Physical corresponding to the virtual address Addr_Virtual; generating N access addresses Addr_Physical(n) according to the physical address Addr_Physical, where n is an integer and $1 \leq n \leq N$, and row addresses of the N access addresses are Addr_Physical_Row(n)=n*M+Addr_Physical_Row, where n is an integer and $1 \leq n \leq N$, M is a quantity of memory rows included in the extended memory, and Addr_Physical_Row is a row address of the physical address Addr_Physical; and an address other than the row address of each of N physical addresses is the same as an address other than the row address of the physical address Addr_Physical; and generating, by the processor system, the N+1 memory access requests according to Addr_Physical and Addr_Physical(n), where n is an integer and $1 \leq n \leq N$.

A third aspect of the embodiments of the present disclosure provides an extended memory controller in a computer, applied to access to-be-accessed data in an extended memory by a processor system in the computer, where the processor system in the computer is connected to an extended memory system by using a memory bus, the extended memory system includes the extended memory controller and the extended memory, and the extended memory controller includes: a receiving module configured to receive N+1 memory access requests serially sent by the processor system in the computer, where access addresses included in all the memory access requests are different from each other and point to a same physical address, the physical address is a storage address of the to-be-accessed data in the extended memory, N≥1, and N is an integer; an execution module configured to: determine the physical address according to the access address carried in the first memory access request when a first memory access request of the N+1 memory access requests is received, where the physical address is the storage address of the to-be-accessed data in the extended memory, generate a read request for obtaining the to-be-accessed data, and return a specific response message to the processor system, where the read request includes the physical address; before the to-be-accessed data returned by the extended memory is received, each time a memory access request of the N+1 memory access requests is received, generate a specific response message within an access delay specified in a memory bus protocol; write the to-be-accessed data into a data buffer after the to-be-accessed data returned by the extended memory is received; and read the to-be-accessed data from the data buffer when another memory access request of the N+1 memory access requests is received, and send the to-be-accessed data to a sending module; and the sending module configured to: send the read request to the extended memory; before the to-be-accessed data returned by the extended memory is received, each time the memory access request of the N+1 memory access requests is received, return the specific response message to the processor system within the access delay specified in the memory bus protocol; and receive the to-be-accessed data from the execution module, and send the to-be-accessed data to the processor system.

With reference to the third aspect, in a first possible implementation manner, the access addresses in all the N+1 memory access requests include a same bank address and different row addresses.

With reference to the third aspect and the first possible implementation manner of the third aspect, in a second possible implementation manner, the execution module is further configured to: preset a mapping relationship between the access addresses included in all the N+1 memory access requests and the physical address of the to-be-accessed data in the extended memory; and query, according to the access address carried in the first memory access request, the mapping relationship between the access address included in the first memory access request and the physical address of the to-be-accessed data in the extended memory, so as to obtain the physical address of the to-be-accessed data in the extended memory.

With reference to the second possible implementation manner of the third aspect, in a third possible implementation manner, the execution module is further configured to: create a record in the data buffer after the physical address is determined according to the access address carried in the first memory access request, where the record includes a tag field and a data field, and set the tag field to the physical address.

With reference to the third possible implementation manner of the third aspect, in a fourth possible implementation manner, the record further includes a validity field, and the execution module is further configured to set the validity field in the record to invalid.

With reference to the fourth possible implementation manner of the third aspect, in a fifth possible implementation manner, the execution module is further configured to: each time the memory access request is received, query the mapping relationship according to the access addresses carried in all the memory access requests, so as to obtain the physical address; and query the record in the data buffer according to the physical address, and generate the specific response message when it is determined that the validity field in the record is invalid.

With reference to the fourth possible implementation manner of the third aspect, in a sixth possible implementation manner, the execution module is further configured to: search the data buffer for the record corresponding to the physical address after the to-be-accessed data returned by the extended memory is received, set the data field in the record to the to-be-accessed data, and set the validity field to valid.

A fourth aspect of the embodiments of the present disclosure provides a computer system including an extended memory, where the computer system includes a processor system, a main memory, the extended memory controller as described in the third aspect or each implementation manner of the third aspect, and the extended memory; the extended memory controller is connected to the extended memory, the extended memory controller is connected to the processor system by using a memory interface, and the processor system is connected to the main memory; the main memory is configured to store an executable instruction; and the processor system is configured to execute the executable instruction stored in the main memory, so that the processor system performs the method for accessing the extended memory in the extended memory system by the computer as described in the second aspect or each implementation manner of the second aspect.

Based on the foregoing technical solutions, according to the method for accessing the extended memory, the device, and the system that are provided in the embodiments of the present disclosure, after receiving N+1 memory access requests serially sent by a processor system (N is a positive integer greater than or equal to 1), an extended memory controller sends, to the extended memory, a request for reading to-be-accessed data, and in a process of reading the to-be-accessed data from the extended memory, the extended memory controller returns a special response message for the received memory access request within an access delay specified in a memory bus protocol until the to-be-accessed data is read and written into a data buffer, and returns the to-be-accessed data to the processor system in an execution cycle of a next memory access request. In the foregoing process, the delay caused by execution of the N+1 memory access requests with row misses is used to effectively compensate for a delay of reading the to-be-accessed data from the extended memory and returning the to-be-accessed data to the processor system by the extended memory controller.

BRIEF DESCRIPTION OF DRAWINGS

To describe the technical solutions in the embodiments of the present disclosure more clearly, the following briefly describes the accompanying drawings.

DESCRIPTION OF EMBODIMENTS

Figure 1:
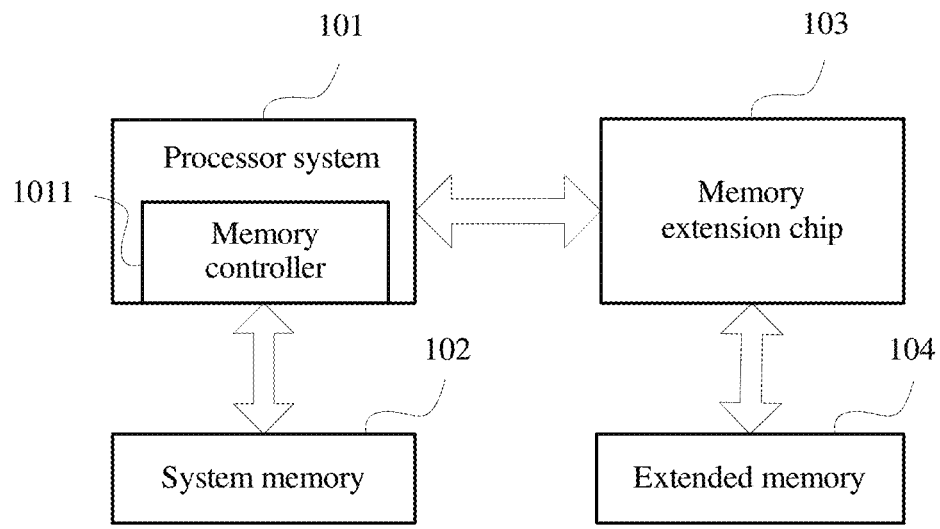
FIG. 1 is a schematic diagram of hardware composition of a computer system including an extended memory.

The following clearly describes the technical solutions in the embodiments of the present disclosure with reference to the accompanying drawings. The described embodiments are a part rather than all of the embodiments of the present disclosure.

Generally, a program module includes a routine, a program, a component, a data structure, and other types of structures for executing a particular task or implementing a particular abstract data type. In addition, a person skilled in the art may understand that each embodiment may be implemented by using other computer system configurations, including a handheld device, a multiprocessor system, microprocessor-based or programmable consumer electronics, a small computer, a mainframe computer, and a similar computing device. Each embodiment may further be implemented in a distributed computing environment in which a task is performed by a remote processing device that is connected by using a communications network. In the distributed computing environment, the program module may be located in local and remote storage devices.

Each embodiment may be implemented as a process implemented by a computer; a computing system; or a computer storage medium of a computer program in which a computer program product or a computer system or the like executes an instruction of an example process. For example, a computer readable storage medium may be implemented by using one or more of a volatile computer memory, a non-volatile memory, a hard disk drive, a flash drive, a floppy disk, a compact disc, or a similar medium.

In this specification, a term "processor system" refers to a system including a processor and a memory controller. When the memory controller is integrated into the processor, the processor system refers to a processor chip including the memory controller. With reference to an application scenario of this embodiment of the present disclosure, the processor chip in the processor system is configured to receive a memory access instruction generated in a process of executing an object program, generate a memory access request according to an address of to-be-accessed data, and send the memory access request to the memory controller. The memory controller decomposes, according to a memory bus protocol, the memory access request into data read/write requests that can be executed by a memory chip.

In this specification, a term "memory controller" is a computer component that controls a memory in a computer system. The memory controller enables data exchange between the memory and a processor. In a specific application, the memory controller may be independent of the processor, or may be integrated into the processor. In this specification, the "memory controller" is configured to control access to a system memory. In many cases, the memory controller is integrated into the processor. If the memory controller is independent of the processor, the memory controller needs to be connected to the processor.

In this specification, a term "extended memory controller" is configured to connect to a memory controller by using a memory interface and is used as a bridge for a processor to access an extended memory.

In this specification, a term "extended memory" refers to a memory that is connected by using a memory extension chip, to implement memory expansion. The extended memory may be implemented in, but not limited to, the following forms: a dynamic random-access memory (DRAM), a phase change memory (PCM), and a magnetic random access memory (MRAM).

In this specification, the term "memory access instruction" refers to memory access instructions such as Load and Store that are included in object code that is obtained by compiling source code, and these memory access instructions are executed by a processor. In an execution process, the processor needs to convert a virtual address in the memory access instruction to a physical address in a virtual address to physical address conversion process, generate a memory access request, and send the memory access request to a memory controller for execution.

In this specification, a term "memory access request", also referred to as a "memory access request", refers to a request that is for accessing data in a memory and that is generated after a processor executes a memory access instruction. The memory access request includes a read request and a write request.

In this specification, a term "data buffer" refers to a storage device configured to store to-be-accessed data that is read from an extended memory, and may be integrated into an extended memory controller, or may be implemented independently of an extended memory controller.

Figure 2:
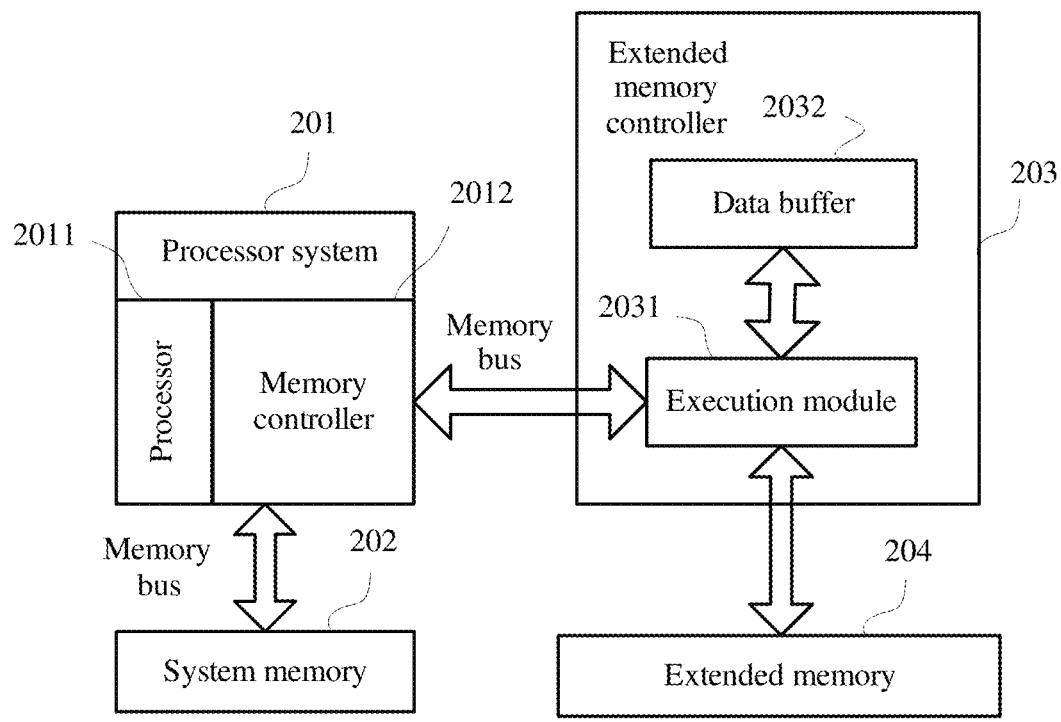
FIG. 2 is a schematic diagram of a hardware composition structure of a computer system according to an embodiment of the present disclosure.

A Hardware Architecture of a System Corresponding to an Embodiment of the Present Disclosure Before a specific embodiment of the present disclosure is described, a hardware composition structure of a system corresponding to an embodiment of the present disclosure is first described. Referring to FIG. 2, the following components are included:

Processor system 201: The processor system 201 includes a processor 2011 and a memory controller 2012. As an instruction execution component, in this embodiment provided in the present disclosure, the processor system 201 is configured to receive a memory access instruction generated by an executable program in an execution process, and generate a memory access request according to the memory access instruction. The processor 2011 is configured to process the memory access instruction, generate the memory access request, and send the memory access request to the memory controller 2012. The memory controller 2012 determines, according to location attribute information included in the memory access request, whether to access a system memory 202 or an extended memory 204. When it is determined that the system memory 202 is to be accessed, the memory access request is sent to the system memory 202; or when it is determined that the extended memory 204 is to be accessed, the memory access request is sent to an extended memory controller 203.

System memory 202: The system memory 202 refers to a memory directly connected to the processor system 201 by using a memory bus, and is configured to temporarily store operational data of the processor system 201 in the execution process.

Extended memory controller 203: The extended memory controller 203 is configured to connect to the extended memory 204 and is used as a bridge for the processor system 201 to perform memory access processing on the extended memory 204. The extended memory controller 203 is connected to the processor system 201 by using the following types of buses, and these types of buses include but are not limited to: a DDR bus, a low-power DDR (LPDDR) bus, or a Wide I/O bus. The extended memory controller 203 includes at least the following modules: an execution module 2031 configured to perform a read operation on to-be-accessed data in the extended memory, and a data buffer 2032 configured to temporarily store the to-be-accessed data that is read from the extended memory 204 by the execution module 2031. It should be noted that the data buffer 2032, as a component for caching the to-be-accessed data, may be integrated into the extended memory controller 203, or may be implemented independently of the extended memory controller 203. This is not limited in this embodiment of the present disclosure.

Extended memory 204: The extended memory 204 refers to an extended memory different from the system memory 202, and is configured to store the operational data of the processor system 201 in the execution process. The extended memory 204 may be implemented by using different storage media, such as a DRAM, PCM, and an MRAM.

In a schematic diagram of the hardware composition structure of the system shown in FIG. 2, because of existence of the extended memory controller 203 that serves as a memory extension chip, there is a relatively high delay in a process of executing a read request that is used for requesting data in the extended memory 204 and that is sent by the processor system 201, and the to-be-accessed data cannot be returned within an access delay required by a DDR protocol. With reference to FIG. 2, a problem of the delay of accessing the extended memory is analyzed based on FIG. 3.

Figure 3:
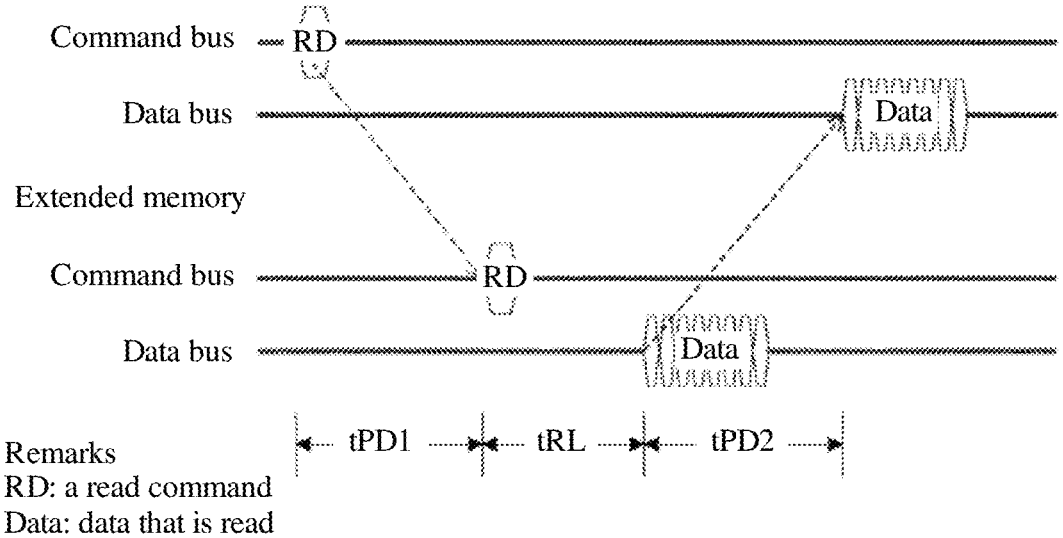
FIG. 3 is a schematic diagram of analyzing a delay of accessing an extended memory by a computer according to an embodiment of the present disclosure.

In FIG. 3, the following three delays exist in performing an operation of reading the data in the extended memory 204:

tPD1: a delay of transmitting the memory access request, which is sent by the processor system 201, from "the extended memory controller 203" to "the extended memory 204", including a transmission delay of a signal, and a delay of logic processing in the extended memory controller 203;

tRL: a delay of the extended memory 204 from "receiving the memory access request" to "transmitting the to-be-accessed data to a bus between the extended memory 204 and the extended memory controller 203"; and tPD2: a delay of transmitting the data, which is read from the extended memory 204, from "the extended memory 204 to the extended memory controller 203", and from "the extended memory controller 203" to "the memory controller 2012 in the processor system 201".

An actual memory access delay of the processor is tPD1+tRL+tPD2. This does not meet a requirement of a memory access protocol (such as the DDR protocol): the to-be-accessed data needs to be returned within the tRL delay. Therefore, how to compensate for a delay tPD1+tPD2 becomes a starting point of this embodiment of the present disclosure.

An existing memory bus protocol (for example, the DDR protocol is commonly used) is a fixed-delay synchronous memory access protocol. Execution of one memory access request is divided into the following three stages:

A. Activate: The memory controller sends an activate command and a row address to read one row of data that is in a DRAM and that is corresponding to the row address into a row buffer.

B. Read/write: The memory controller sends a read/write command and a column address to read/write data that is corresponding to the column address and that is in the row buffer.

C. Pre-charge: The memory controller sends a pre-charge command to close the row buffer.

Two consecutive memory access requests may be classified into the following two types according to whether row addresses of the two consecutive memory access requests are the same:

(1) Row hit: Data that needs to be operated by the two memory access requests is located on a same row (that is, the row addresses are the same) in a same Bank. Therefore, after the read/write command of a first memory access request is executed, the row data is still located in the row buffer, so the memory controller can directly send the read/write command and the column address that are of the second memory access request without executing the pre-charge stage of the first memory access request and the activate operation stage of the second memory access request.

(2) Row miss: Data that needs to be operated by the two memory access requests is located on different rows in the same bank. After the read/write stage of the first memory access request is executed, the pre-charge operation (for example, the Pre-Charge command) needs to be performed to close the row buffer, then the activate operation (for example, the Activate command) is performed on a row of the second memory access request to read the row data into the row buffer, and finally, the read/write command and the column address that are of the second memory access request can be sent.

Figure 4:
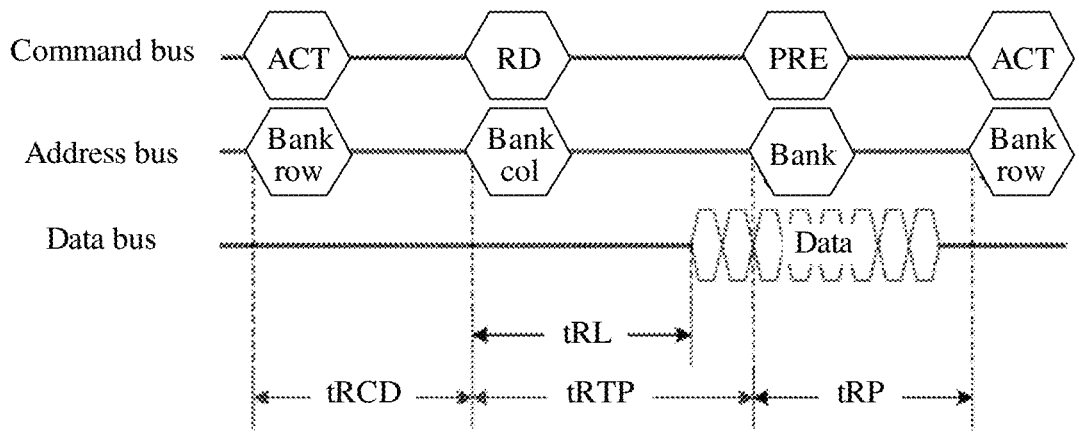
FIG. 4 is a schematic diagram of analyzing a time sequence during execution of a memory access request in a DDR protocol.

FIG. 4 shows a time sequence requirement in a process of executing a memory access request in the DDR protocol.

tRL: a fixed delay from "sending a read (RD) command" to "data entering a memory bus";

tRCD: a minimum time interval from "sending an activate (ACT) command" to "sending the read (RD) command";

tRTP: a minimum time interval from "sending the read (RD) command" to "sending a pre-charge (PRE) command"; and tRP: a minimum time interval from "sending the pre-charge (PRE) command" to "sending a next activate (ACT) command".

It may be calculated, according to the foregoing parameters, that a minimum time interval between two RD commands with row misses is tGAP min=tRCD+tRTP+tRP.

In addition, a memory barrier technology may be used. A memory barrier, also referred to as a memory bar, a memory fence, a fence instruction, and the like, is a type of synchronous fence instruction and is a point of synchronization in an operation of randomly accessing a memory by a CPU or a compiler, so that an operation after this point can be performed only after all read/write operations before this point are performed.

To compensate for a delay in a process of accessing an extended memory, in this embodiment of the present disclosure, the delay in a process of executing multiple memory access requests with row misses is used to compensate for the delay of accessing to-be-accessed data in the extended memory. For a requirement that an application program accesses data in an extended memory 204, an extended memory access request is compiled into the multiple memory access requests with row misses by using software (such as a compiler), or the fence instruction is inserted between the multiple generated memory access requests. In the process of executing the multiple memory access requests, based on the delay of the memory access request with a row miss and the delay caused by execution of the fence instruction between the multiple memory access requests, the to-be-accessed data in the extended memory is first read into an extended memory controller (in other words, a data pre-fetch stage), and then is read from the extended memory controller into a processor by using a memory controller (in other words, a data read stage).

Method Embodiments of the Present Disclosure

Figure 5A:
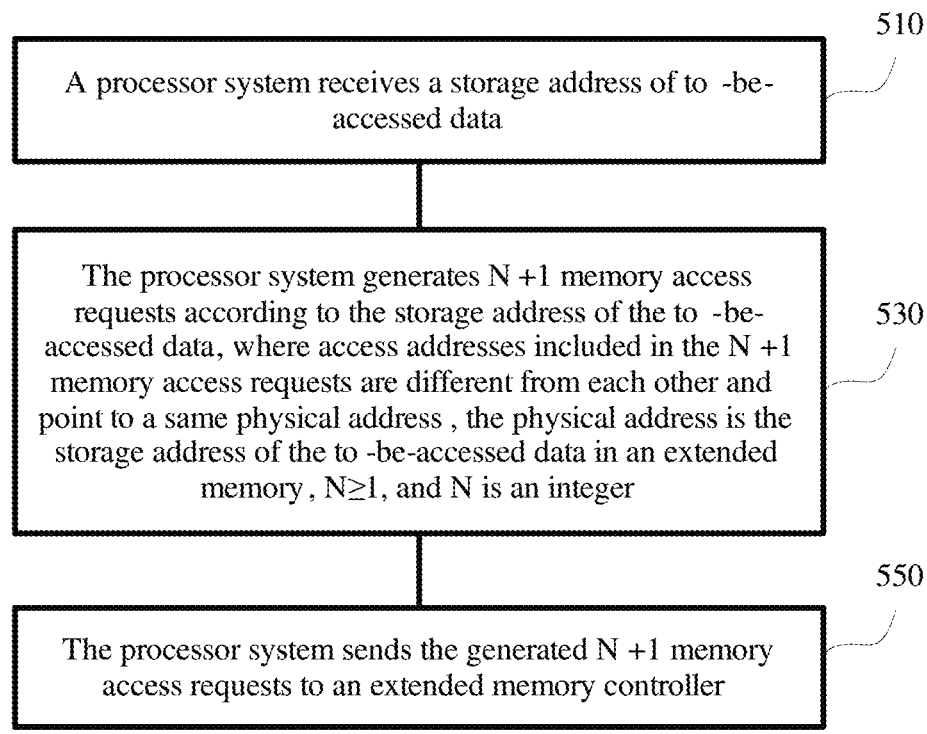
FIG. 5A is a schematic flowchart of an embodiment of a processing method for accessing data in an extended memory.

FIG. 5A shows a schematic flowchart of a method embodiment of accessing an extended memory by a computer, including the following steps.

510. A processor system receives a storage address of to-be-accessed data.

Specifically, in an execution process, an executable program obtained by using a compiler generates N+1 memory access instructions, where the N+1 memory access instructions all include the storage address of the to-be-accessed data. In specific implementation, the storage address of the to-be-accessed data is a virtual address.

530. The processor system generates N+1 memory access requests according to the storage address of the to-be-accessed data, where access addresses included in the N+1 memory access requests are different from each other and point to a same physical address, the physical address is the storage address of the to-be-accessed data in an extended memory, N≥1, and N is an integer.

Specifically, the generated N+1 access addresses are different from each other. This prevents the memory access requests generated according to the N+1 access addresses from being merged by a processor in a Miss-status Handling Register (MSHR). The N+1 access addresses point to the same physical address. In specific implementation, there is a mapping relationship between the N+1 access addresses and the physical address of the to-be-accessed data in the extended memory.

550. The processor system sends the generated N+1 memory access requests to an extended memory controller.

Specifically, to compensate for a delay of accessing the to-be-accessed data in the extended memory, in the processor system, after generating the N+1 memory access requests, the processor sends the N+1 memory access requests to a memory controller in the processor system. The processor may sequentially send the N+1 memory access requests to the memory controller at regular intervals, or may send all the N+1 memory access requests to the memory controller at a time. After receiving the N+1 memory access requests, the memory controller determines that access addresses are different from each other (in particular, row addresses are different), and identifies the N+1 memory access requests as memory access requests with row misses. Therefore, the N+1 memory access requests are serially sent according to a sending delay requirement for memory access requests with row misses that is specified in a memory access protocol.

It should be noted that the N+1 memory access instructions are included in an object program. The object program is obtained by the compiler by compiling a source program. A computer system in which the source program is compiled may be a computer system in this embodiment of the present disclosure, or may be a third-party computer system.

For a computer that includes an extended memory system, when developing the source program, a software developer defines a type and a storage location of each variable. The developer defines that some variables are temporarily stored in a system memory and other variables are temporarily stored in the extended memory.

In a process of using the variable defined in the extended memory in a program, a read/write operation on the variable (which is referred to as the "to-be-accessed data" in this specification) needs to be involved. In this embodiment of the present disclosure, in a process of compiling the source program, when there is a requirement for accessing a specific piece of to-be-accessed data stored in the extended memory, the compiler compiles a request for accessing the to-be-accessed data into the N+1 memory access requests according to a delay parameter of the extended memory and a delay requirement of a memory bus protocol, where N≥1, and N is an integer.

Further, a quantity of memory access requests that need to be sent is determined in the following manner.

(1) A delay of transmitting the memory access request from the "extended memory controller" to the "extended memory" is tPD1, and a delay of transmitting data, which is read according to the memory access request, from the "extended memory" to the "extended memory controller" is tPD2.

Specifically, once a computer system including the extended memory is determined, the foregoing two parameters may be determined.

(2) It is determined that a DDR-protocol-compliant time interval between two consecutive memory access requests with row misses sent by the processor is tGAP min=tRCD+tRTP+tRP.

Specifically, referring to FIG. 4 and related descriptions, a minimum time interval between the two memory access requests with row misses sent by the processor is at least tRCD+tRTP+tRP, and the foregoing parameters are specified in the DDR protocol.

Further, after the memory access request is generated, the processor may insert one fence instruction after each memory access request at the time interval between the two consecutive memory access requests sent by the processor, that is, a delay is implemented by executing the fence instruction, and an execution time of the fence instruction is T_Fence.

(3) A quantity N of memory access requests that need to be generated is calculated according to the foregoing parameters, that is, N≥[(tPD1+tPD2)/(tRCD+tRTP+tRP)], where [*] is a rounding function.

Further, after the processor inserts the fence instruction in the generated N+1 memory access requests, the calculated N≥[(tPD1+tPD2)/T_Fence], where [*] is a rounding function. T_Fence is the delay for executing the fence instruction by the processor.

Figure 5B:
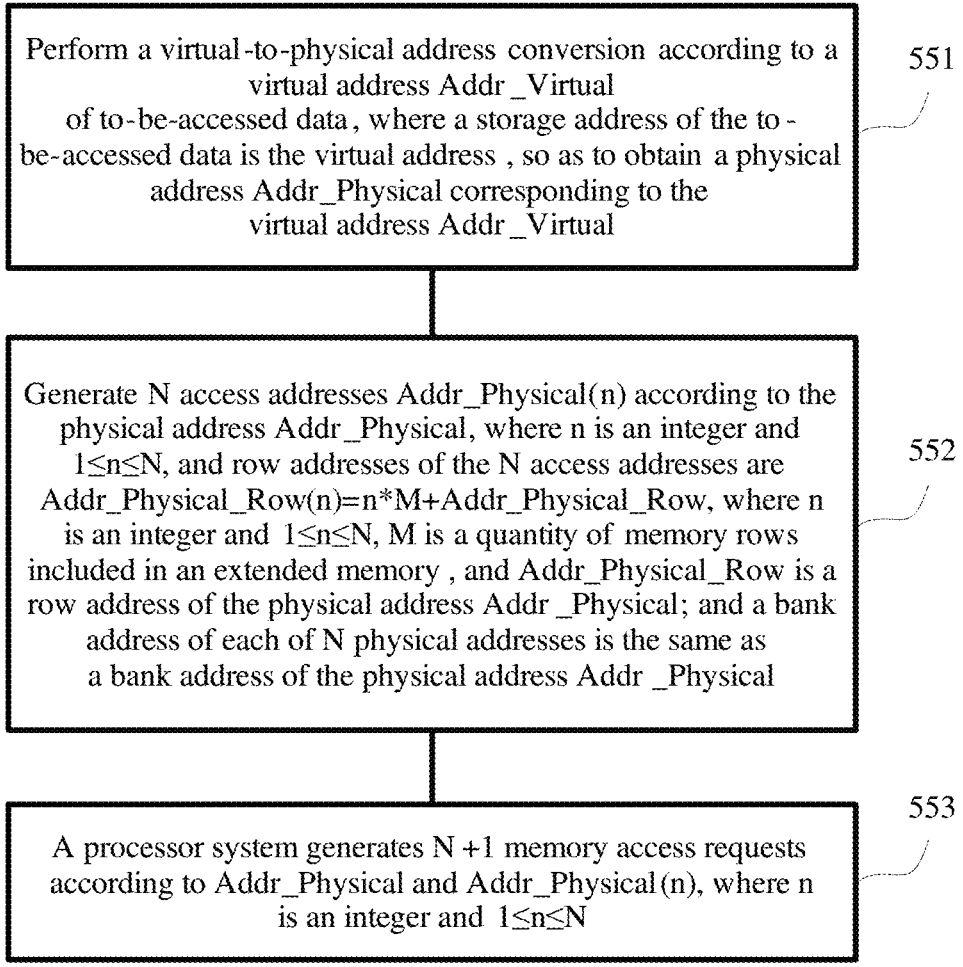
FIG. 5B is a schematic flowchart of generating N+1 access addresses according to a storage address of to-be-accessed data.

In specific implementation, the N+1 access addresses generated according to the storage address of the to-beaccessed data may be obtained by performing the following steps 551 to 553, as shown in FIG. 5B.

551. A virtual-to-physical address conversion is performed according to a storage address Addr_Virtual of to-be-accessed data, where the storage address of the to-be-accessed data is the virtual address, so as to obtain a physical address Addr_Physical corresponding to the virtual address Addr_Virtual.

It should be noted that an address included in the memory access instruction received by the processor is generally a virtual address. A virtual-to-physical address conversion is performed according to the virtual address of the to-be-accessed data, so as to obtain the physical address corresponding to the virtual address.

552. Generate N access addresses Addr_Physical(n) according to the physical address Addr_Physical, where n is an integer and 1≤n≤N; row addresses of the N access addresses are Addr_Physical_Row(n)=n*M+Addr_Physical_Row, where n is an integer and 1≤n≤N, M is a quantity of memory rows included in an extended memory, and Addr_Physical_Row is a row address of the physical address Addr_Physical; and a bank address of each of N physical addresses is the same as a bank address of the physical address Addr_Physical.

Specifically, for a purpose of generating N+1 memory access requests with row misses, it needs to be ensured that addresses of the N+1 memory access requests include a same bank address and different row addresses.

Figure 6:
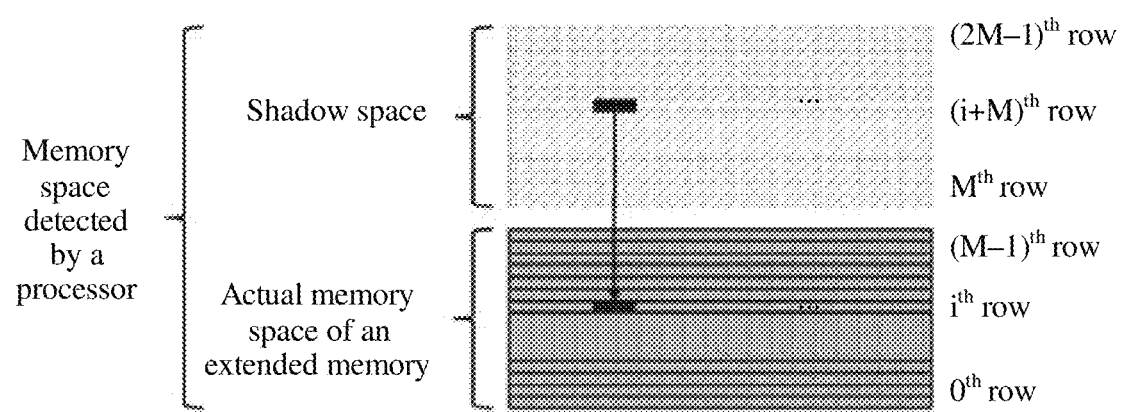
FIG. 6 is a schematic diagram of an extended memory space detected by a processor according to an embodiment of the present disclosure.

An address space of the extended memory needs to be redefined. Referring to FIG. 6, N=1 is used as an example, and the processor generates two access addresses according to the physical address of the to-be-accessed data, so as to generate two memory access requests for the extended memory.

In FIG. 6, a memory space that can be detected by the processor includes two parts: an actual memory space of the extended memory and a shadow space. The memory space corresponding to the extended memory includes M memory rows, and the shadow space and the memory space corresponding to the extended memory are of a same size (sizes of rows and columns are the same). For a purpose of ensuring that the two memory access requests are used as the memory access requests with row misses, it needs to be ensured that the addresses of the two memory access requests include a same bank address and different row addresses.

Therefore, in the addresses of the memory access requests, the row address of a memory access request is i, and the row address of the other memory access request is i+M. This ensures that the row addresses of the two memory access requests are different. In addition, the row address corresponding to the physical address of the to-be-accessed data in the extended memory space is obtained by subtracting the offset M from the row address in the shadow space. This ensures that the two addresses point to a same physical address in the extended memory.

Further, in addition to the row address, the physical address in the extended memory includes the bank address. If it is ensured that the generated N+1 access addresses include a same bank address and different row addresses, the memory controller in the processor system can identify the N+1 memory access requests as memory access requests with row misses when receiving the N+1 memory access requests.

It should be noted that, to simplify a description of this embodiment of the present disclosure, the N+1 access addresses that are generated based on the physical address of the to-be-accessed data are in a same memory chip by default. In specific implementation, in addition to the bank address and the row address, the access address, as a memory physical address, further includes a channel address, a dual in-line memory module (DIMM) address, a rank address, and a chip address according to a requirement of the memory physical address. Therefore, in specific implementation of a solution, the "generated N+1 access addresses" may be set to be the same as the channel address, the DIMM address, the rank address, and the chip address of the "physical address of the to-be-accessed data".

It may be understood that, in the foregoing implementation manner, N=1 is used as an example. For another value, an address of a memory access request may be generated and N+1 memory access requests may be created according to a similar process.

553. A processor system generates N+1 memory access requests according to Addr_Physical and Addr_Physical(n), where n is an integer and 1≤n≤N.

In the foregoing embodiment, in a process of accessing the to-be-accessed data in the extended memory by the processor system in a computer, the processor generates the N+1 memory access requests, and access addresses included in the generated N+1 memory access requests include a same bank address and different row addresses, so that the memory controller integrated into the processor triggers the memory access request with a row miss when executing the N+1 memory access requests. In a process of executing the N+1 memory access requests with row misses, the extended memory controller can read the to-be-accessed data from the extended memory based on this processing delay, and finally, returns the to-be-accessed data to the processor system. In the foregoing implementation manner, the delay in the process of executing the memory access request with a row miss is effectively used to resolve a problem that the to-be-accessed data cannot be returned within a specified delay range.

Figure 7:
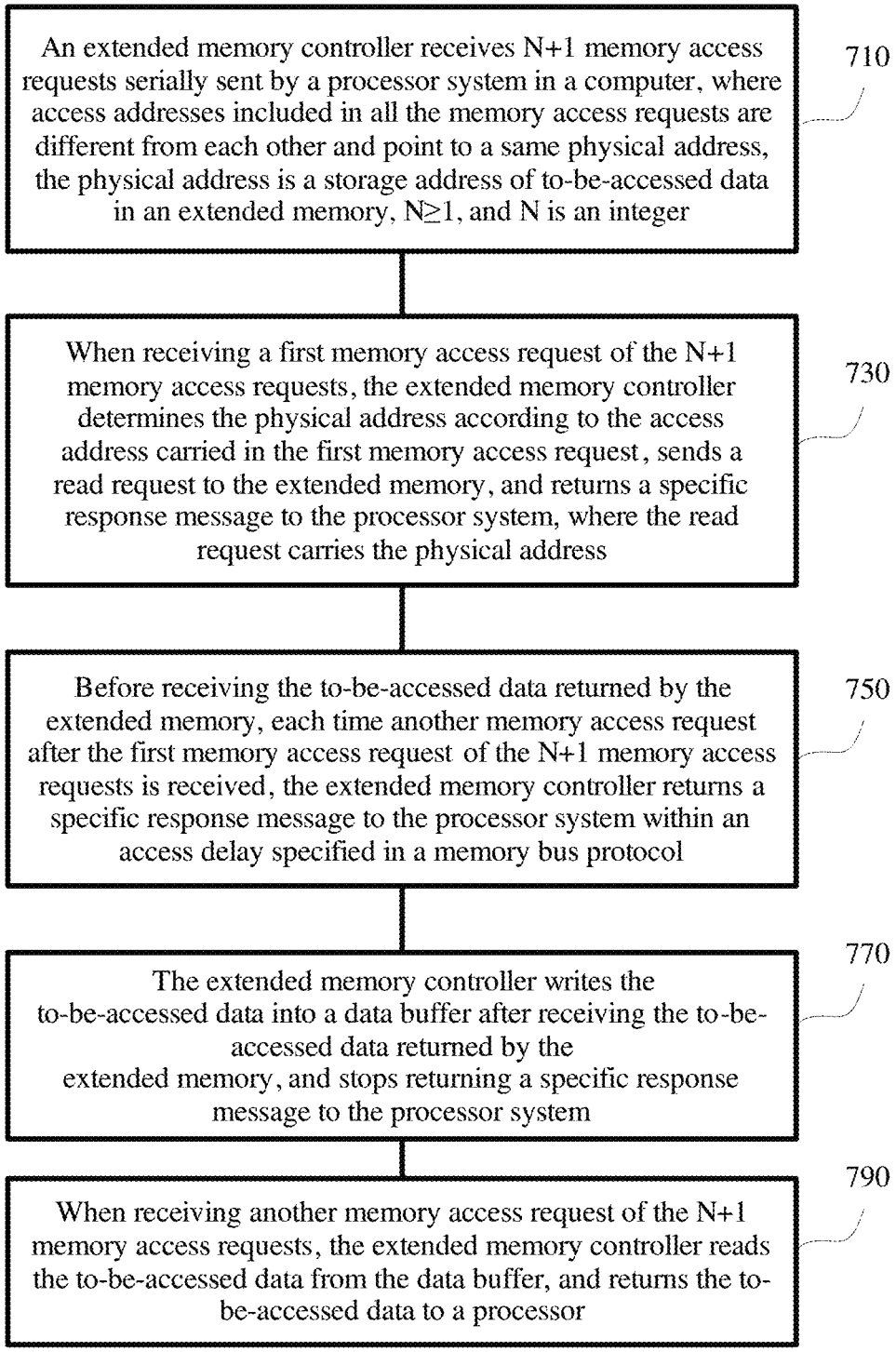
FIG. 7 is a schematic flowchart of an embodiment of processing a memory access request by an extended memory controller.

FIG. 7 shows a processing process after an extended memory controller receives N+1 memory access requests sent by a processor system. An extended memory system includes the extended memory controller and an extended memory. The processor system in a computer is connected to the extended memory controller by using a memory bus. When the processor system in the computer needs to access to-be-accessed data stored in the extended memory, the method includes the following steps.

710. The extended memory controller receives N+1 memory access requests serially sent by the processor system in the computer, where access addresses included in all the memory access requests are different from each other and point to a same physical address, the physical address is a storage address of to-be-accessed data in the extended memory, N≥1, and N is an integer.

Specifically, the extended memory controller receives the N+1 memory access requests serially sent by the processor system in the process described in step 550. The access addresses included in the N+1 memory access requests are different from each other, and the N+1 access addresses point to the same physical address.

730. When receiving a first memory access request of the N+1 memory access requests, the extended memory controller determines the physical address according to the access address carried in the first memory access request, sends a read request to the extended memory, and returns a specific response message to the processor system, where the read request carries the physical address.

Specifically, when receiving the first memory access request, the extended memory controller determines the physical address according to the access address of the first memory access request, and sends the read request for the physical address to the extended memory, where the read request is used to read the to-be-accessed data from the extended memory.

750. Before receiving the to-be-accessed data returned by the extended memory, each time a memory access request after the first memory access request of the N+1 memory access requests is received, the extended memory controller returns the specific response message to the processor system within an access delay specified in a memory bus protocol.

Specifically, because a relatively high delay is required in a process of reading the to-be-accessed data, and the memory bus protocol is a fixed-delay synchronous memory access protocol, the extended memory controller needs to return a response message for each memory access request. Therefore, the extended memory controller returns the specific response message for the first memory access request to a processor. It should be noted that the specific response message is a special identifier agreed upon by the processor and the extended memory controller, for example, 0x5a5a5a5a5a5a5a5a may be used as the special identifier.

It should be noted that the special identifier is a customizable identifier. In specific implementation, another identifier may also be used. This is not limited in any embodiment of the present disclosure.

770. The extended memory controller writes the to-be-accessed data into a data buffer, and stops returning a specific response message to the processor system after receiving the to-be-accessed data returned by the extended memory.

Specifically, in step 730, the read request sent by the extended memory controller is sent to the extended memory, and a relatively high delay is required in the process of reading the to-be-accessed data from the extended memory. At this stage, some memory access requests of the N+1 memory access requests are sent by the processor to the extended memory controller. In this case, after receiving these memory access requests, the extended memory controller returns the specific response message to the processor within the delay required by the memory bus protocol, so as to notify the processor that the to-be-accessed data has not been obtained. When receiving the to-be-accessed data returned by the extended memory, the extended memory controller writes the to-be-accessed data into the data buffer.

It should be noted that the data buffer may be integrated into the extended memory controller, or may be implemented independently of the extended memory controller.

790. When receiving another memory access request of the N+1 memory access requests, the extended memory controller reads the to-be-accessed data from the data buffer, and returns the to-be-accessed data to the processor system.

Specifically, because the memory bus protocol is a fixed-delay synchronous memory access protocol, after the to-be-accessed data is written into the data buffer, the extended memory controller reads the to-be-accessed data from the data buffer, and returns the to-be-accessed data to the processor system in an execution cycle of a next memory access request.

Further, the access addresses in all the N+1 memory access requests include a same bank address and different row addresses. A memory controller integrated into the processor identifies the memory access request having this feature as a memory access request with a row miss, so that the delay specified in a memory access protocol can be generated in a process of executing the N+1 memory access requests.

Further, the extended memory controller presets a mapping relationship between the access addresses included in all the N+1 memory access requests and the physical address of the to-be-accessed data in the extended memory. The determining, by the extended memory controller, the physical address according to the access address carried in the first memory access request includes: querying, by the extended memory controller, the mapping relationship according to the access address carried in the first memory access request, so as to obtain the foregoing physical address.

Further, in step 730, after the determining, by the extended memory controller, the physical address according to the access address carried in the first memory access request, the method embodiment further includes: creating, by the extended memory controller, a record in the data buffer, where the record includes a tag field and a data field, and setting the tag field to the physical address.

Further, in step 730, the record includes a validity field, and the method embodiment further includes: setting, by the extended memory controller, the validity field to invalid.

Further, in step 750, in the process of reading the to-be-accessed data from the extended memory, each time the extended memory controller receives the memory access request, the method further includes: querying, by the extended memory controller, the mapping relationship according to the access addresses carried in all the memory access requests, so as to obtain the physical address; and querying the record in the data buffer according to the physical address, and when determining that the validity field in the record is invalid, generating the specific response message.

Further, in step 770, the writing, by the extended memory controller, the to-be-accessed data into a data buffer includes: searching, by the extended memory controller, the data buffer for the record corresponding to the physical address, setting the data field in the record to the to-be-accessed data, and setting the validity field to valid.

In the foregoing implementation process, after receiving the first memory access request, the extended memory controller sends, to the extended memory, a request for reading the to-be-accessed data. In the process of reading the to-be-accessed data from the extended memory, the extended memory controller returns the special response message for the received memory access request within the access delay specified in the memory bus protocol, so that the processor can send the next memory access request according to a row miss requirement, and the extended memory controller temporarily stores read data into the data buffer and returns the to-be-accessed data to the processor system in the execution cycle of the next memory access request. In the foregoing process, the delay caused by execution of the N+1 memory access requests with row misses is used to effectively compensate for a delay of reading the to-be-accessed data from the extended memory and returning the to-be-accessed data to the processor system by the extended memory controller.

According to an empirical value obtained from an experiment, when there are a few levels of extended memories, and read/write of to-be-accessed data is performed on the data in an extended memory, N=1, that is, two memory access requests can be generated to compensate for the delay of reading the data from the extended memory. The following describes two specific implementation processes by using N=1 as an example.

Figure 8:
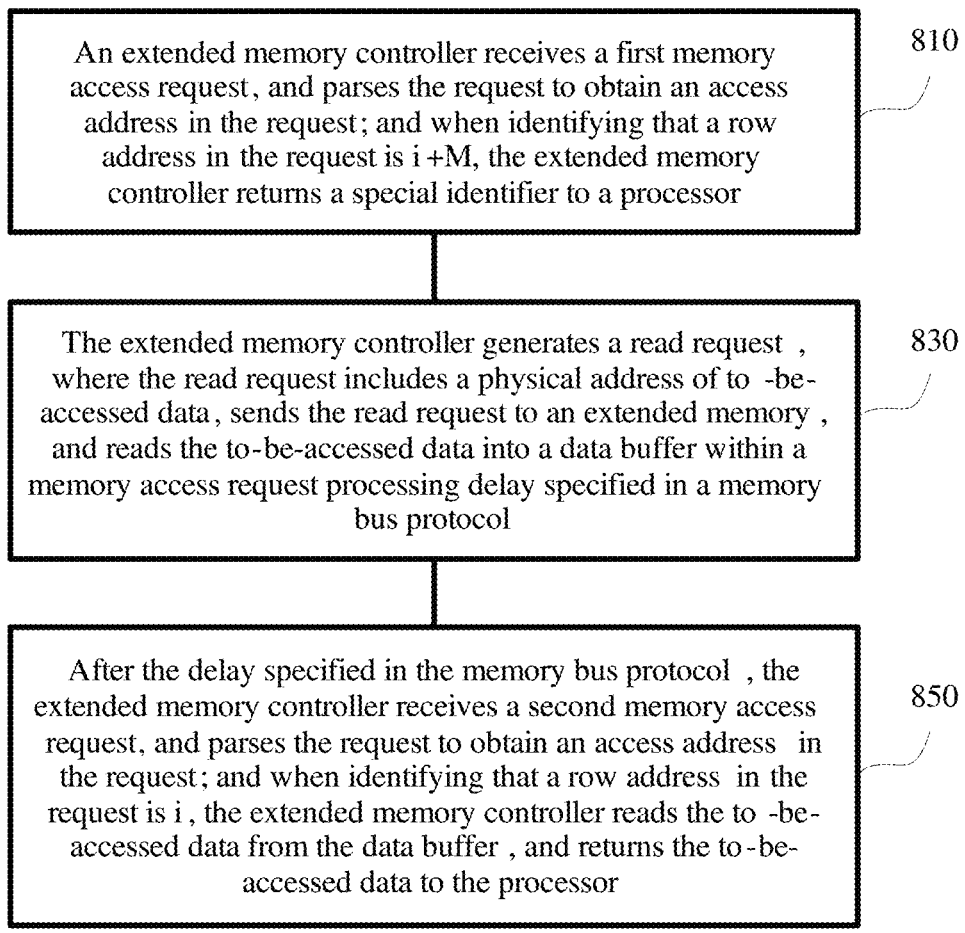
FIG. 8 is a schematic flowchart of an embodiment of in-order execution performed by an extended memory controller.

I. An In-Order Execution Manner (Referring to FIG. 8)

According to the memory space that includes the extended memory in FIG. 6, it can be learned that only one shadow space needs to be virtualized. FIG. 6 is used as an example. With reference to the structural diagram of the system in FIG. 2, it is assumed that the to-be-accessed data is located in an ith row in the extended memory, and the row address of the to-be-accessed data is i. According to the foregoing method, the row addresses of the two generated access addresses are i and i+M. Bank addresses of the two access addresses are set to be the same. The foregoing generated access addresses are recorded in the data buffer in the extended memory controller.

Two memory access requests are constructed according to the generated two access addresses and are sent by the processor to the extended memory controller. It is assumed that the processor first sends the memory access request with the row address of i+M, and then sends the memory access request with the row address of i. An execution process of the method embodiment is as follows:

810. The extended memory controller receives a first memory access request, and parses the request to obtain an access address of the request; and when identifying that a row address of the request is i+M, the extended memory controller returns a special identifier to the processor.

Specifically, because the extended memory controller can identify, according to the row address, that an address in the memory access request is located in an actual memory space of the extended memory or a shadow space, in this step, if it is identified that the row address is i+M, it is determined that the access address is located in the shadow space, and the special identifier (such as 0x5a5a5a5a5a5a5a5a) is generated and is returned to the processor.

830. The extended memory controller generates a read request, where the read request includes a physical address of to-be-accessed data, sends the read request to an extended memory, and reads the to-be-accessed data into a data buffer within a memory access request processing delay specified in a memory bus protocol.

Specifically, after receiving the first memory access request, the extended memory controller generates the request for reading the to-be-accessed data, and sends the read request to the extended memory. The to-be-accessed data is read into the data buffer within the memory access request delay specified in the memory bus protocol.

850. After the delay specified in the memory bus protocol, the extended memory controller receives a second memory access request, and parses the request to obtain an access address of the request; and when identifying that a row address of the request is i, the extended memory controller reads the to-be-accessed data from the data buffer, and returns the to-be-accessed data to the processor system.

Specifically, after reading the to-be-accessed data into the data buffer, the extended memory controller receives the second memory access request sent by the processor, and parses the request to obtain the row address of the access address; and when determining that the row address of the request is i, that is, an address located in the actual memory space of the extended memory, the extended memory controller reads the to-be-accessed data from the data buffer, and returns the to-be-accessed data to the processor system.

In the foregoing embodiment, according to an address access order that is agreed upon in advance, the access address included in the received first memory access request is an address of the shadow space, the access address included in the second memory access request is an address of the actual memory space, and there is a mapping relationship between the address of the shadow space and the address of the actual memory space. When the memory access request including the address of the shadow space is received, the to-be-accessed data is read from the extended memory and is cached to the data buffer. When the memory access request including the address of the actual memory space is received, data is read from the data buffer to the processor.

It may be understood that the foregoing address access order that is agreed upon in advance may further be such an order of "accessing the address of the actual memory space first, and then the address of the shadow space", or further, the addresses included in the two memory access requests are both the address of the shadow space (that is, Addr1 and Addr2), provided that it is ensured that the access addresses included in the two memory access requests have a mapping relationship and point to a same physical address.

Figure 9:
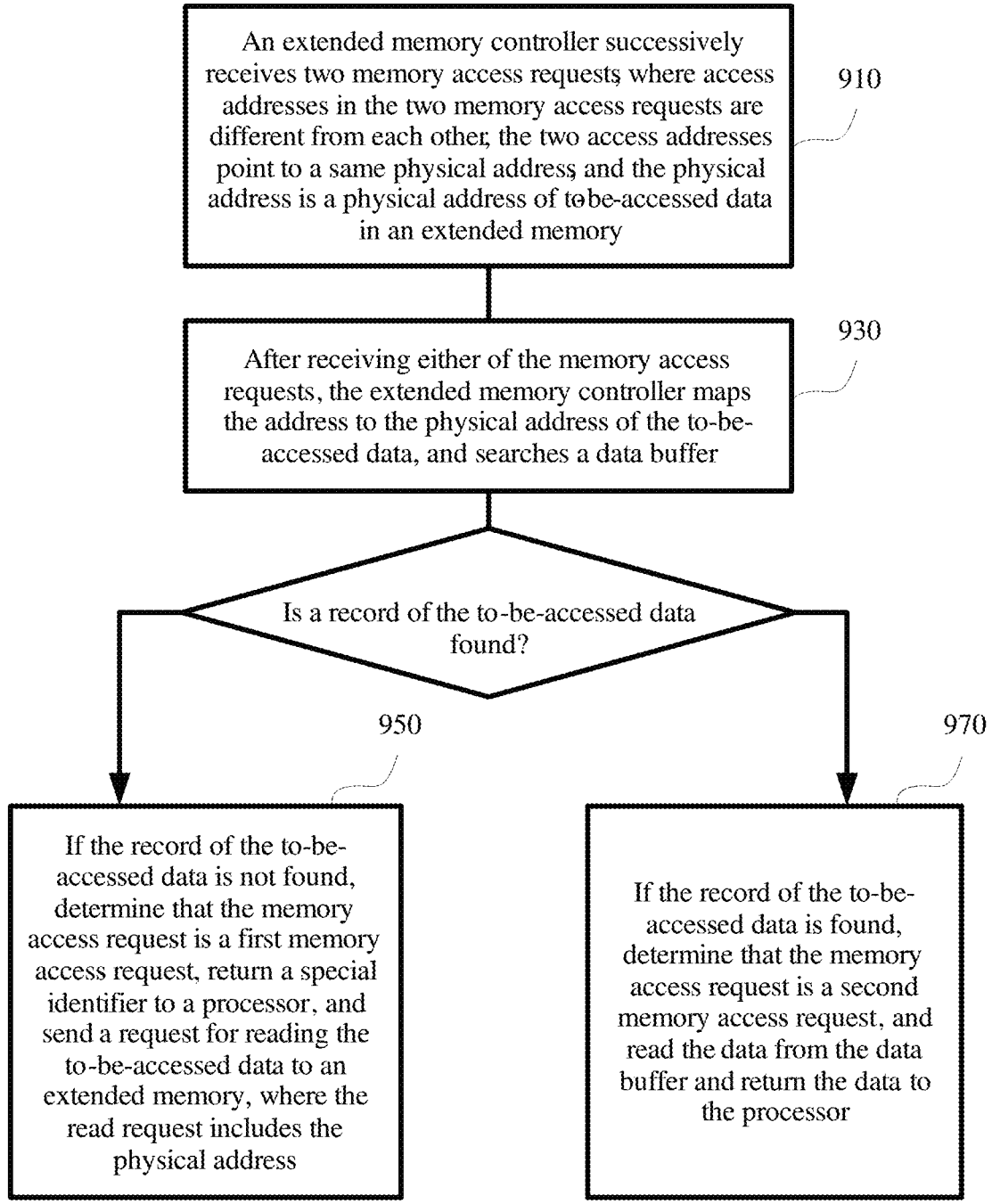
FIG. 9 is a schematic flowchart of an embodiment of out-of-order execution performed by an extended memory controller.

II. An Out-of-Order Execution Manner (Referring to FIG. 9)

Out-of-order herein refers to an inconsistency between an order in which a memory access request is sent to an extended memory controller and an order in which a processor sends the memory access request. In this case, the order in which the memory access request is sent cannot be determined by determining whether a row address of an access address is located in a shadow space or an actual memory space. Therefore, in this case, the order in which the memory access request is sent is determined by querying whether there is to-be-accessed data in a data buffer.

It is assumed that the to-be-accessed data is located in an ith row in an extended memory, and a row address of the to-be-accessed data is i. According to the foregoing method, row addresses of two generated access addresses are i and i+M. Bank addresses of the two access addresses are set to be the same. The foregoing generated access addresses are recorded in the data buffer in the extended memory controller.

Two memory access requests are constructed according to the generated two access addresses and are sent by the processor to the extended memory controller. It is assumed that the processor first sends the memory access request with the row address of i+M, and then sends the memory access request with the row address of i. An execution process of the method embodiment is as follows:

910. The extended memory controller successively receives two memory access requests, where access addresses in the two memory access requests are different from each other, the two access addresses point to a same physical address, and the physical address is a physical address of to-be-accessed data in the extended memory.

Specifically, the access addresses in the two memory access requests are different from each other. This prevents the memory access requests generated according to the two access addresses from being merged by the processor in an MSHR. The two access addresses point to the same physical address. This indicates that there is a mapping relationship between the two access addresses and the physical address.

930. After receiving either of the memory access requests, the extended memory controller maps the address to the physical address of the to-be-accessed data, and searches a data buffer.

Specifically, the data buffer is configured to cache data. In specific implementation, the data buffer may be implemented by using a cache. Storage is performed in an <identifier, data> manner. The physical address of the to-be-accessed data may be used as the identifier.

950. When a record of the to-be-accessed data is not found, determine that the memory access request is a first memory access request, return a special identifier to the processor, and send a request for reading the to-be-accessed data to the extended memory, where the read request includes the physical address.

Specifically, in step 950, when the extended memory controller cannot find, in the data buffer, the record of the to-be-accessed data, it is determined that the received memory access request is the first memory access request. In this case, the read request whose access address is the physical address is generated and is sent to the extended memory, where the read request is used to read the to-be-accessed data. In this process, the extended memory controller further generates the special identifier (such as 0x5a5a5a5a5a5a5a5a), and sends the special identifier to the processor, so that the processor determines, according to the special identifier, that the to-be-accessed data has not been read into the data buffer.

970. When the record of the to-be-accessed data is found, determine that the memory access request is a second memory access request, and read data from the data buffer and return the data to the processor.

Specifically, when the extended memory controller finds the record of the to-be-accessed data, it indicates that the memory access request is the second memory access request, and the data is read from the data buffer and is returned to the processor system.

In the foregoing implementation manner, a processor generates two memory access requests, and sends the two memory access requests to an extended memory controller, so that the extended memory controller reads to-be-accessed data in an extended memory according to the two memory access requests. This resolves a problem that a delay of accessing the to-be-accessed data in the extended memory by the processor cannot meet a memory access protocol requirement.

A Device Embodiment of the Present Disclosure

Figure 10:
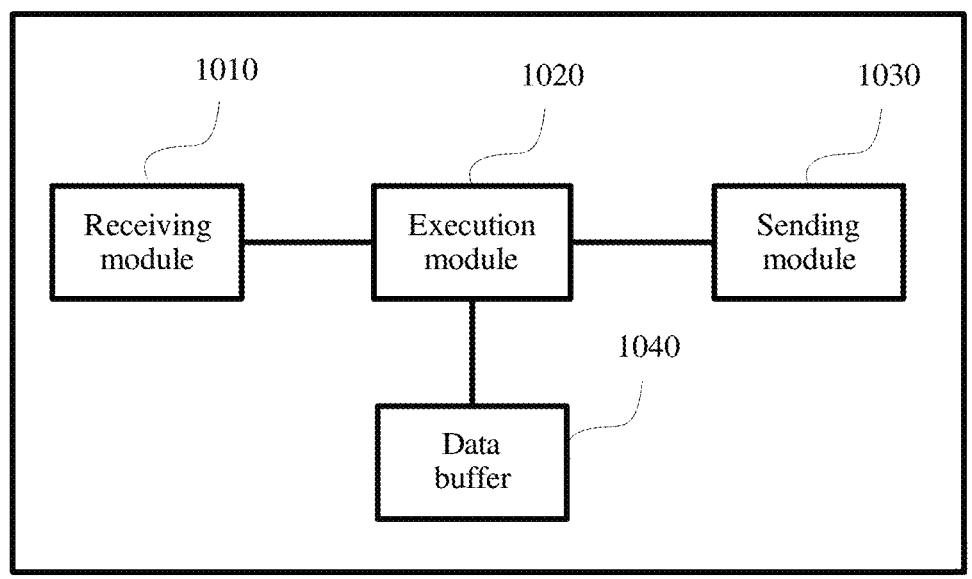
FIG. 10 is a schematic diagram of a composition structure in an embodiment of an extended memory controller.

The present disclosure further provides a device embodiment of an extended memory controller. Referring to FIG. 10, the extended memory controller is applied to access to-be-accessed data in an extended memory by a processor in a computer. The extended memory controller is connected to the computer by using a memory bus. The extended memory controller includes: a receiving module 1010 configured to receive N+1 memory access requests serially sent by a processor system in the computer, where access addresses included in all the memory access requests are different from each other and point to a same physical address, the physical address is a storage address of the to-be-accessed data in the extended memory, N≥1, and N is an integer; an execution module 1020 configured to: when a first memory access request of the N+1 memory access requests is received, determine the physical address according to the access address carried in the first memory access request, where the physical address is the storage address of the to-be-accessed data in the extended memory, send, to the extended memory, a read request for obtaining the to-be-accessed data, and generate a specific response message, where the read request includes the physical address; before the to-be-accessed data returned by the extended memory is received, each time a memory access request of the N+1 memory access requests is received, generate a specific response message within an access delay specified in a memory bus protocol; write the to-be-accessed data into a data buffer 1040 after the to-be-accessed data returned by the extended memory is received, and stop returning a specific response message to the processor system; and after the to-be-accessed data is written into the data buffer 1040, when a memory access request of the N+1 memory access requests is received, read the to-be-accessed data from the data buffer 1040, and send the to-be-accessed data to a sending module; and the sending module 1030 configured to: send the read request to the extended memory, and return the specific response message to the processor system; before the to-be-accessed data returned by the extended memory is received, each time another memory access request after the first memory access request of the N+1 memory access requests is received, return the specific response message to the processor system within the access delay specified in the memory bus protocol; and receive the to-be-accessed data from the execution module 1020, and send the to-be-accessed data to the processor system.

Further, the access addresses in all the N+1 memory access requests include a same bank address and different row addresses.

Further, the execution module 1020 is further configured to: preset a mapping relationship between the access addresses included in all the N+1 memory access requests and the physical address of the to-be-accessed data in the extended memory; and query, according to the access address carried in the first memory access request, the mapping relationship between the access address included in the first memory access request and the physical address of the to-be-accessed data in the extended memory, so as to obtain the physical address of the to-be-accessed data in the extended memory.

Further, the execution module 1020 is further configured to: after the physical address is determined according to the access address carried in the first memory access request, create a record in the data buffer, where the record includes a tag field and a data field, and set the tag field to the physical address.

Further, the record further includes a validity field, and the execution module 1020 is further configured to set the validity field in the record to invalid.

Further, the execution module 1020 is further configured to: each time another memory access request after the first memory access request of the N+1 memory access requests is received, query the mapping relationship according to the access addresses carried in all the memory access requests, so as to obtain the physical address; and query the record in the data buffer 1040 according to the physical address, and generate the specific response message when it is determined that the validity field in the record is invalid.

Further, the execution module 1020 is further configured to: search the data buffer 1040 for the record corresponding to the physical address, set the data field in the record to the to-be-accessed data, and set the validity field to valid.

Further, it should be noted that, in the foregoing embodiment of the extended memory controller, the data buffer 1040 is integrated into the extended memory controller. This is only an implementation manner. A person skilled in the art may understand that the data buffer 1040 may further be implemented independently of the extended memory controller.

The present disclosure further provides a computer system including an extended memory. As shown in FIG. 2, the computer system includes a processor system 201, a system memory 202, an extended memory controller 203 as described in the device embodiment of the extended memory controller, and an extended memory 204. The extended memory controller 203 is connected to the extended memory 204, and the extended memory controller 203 is connected to the processor system 201 by using a memory interface. The processor system 201 is connected to the system memory 202, and the system memory 202 is configured to store an executable instruction. The processor system 201 is configured to execute the executable instruction stored in the system memory 202, so that the processor system 201 performs the method for accessing the extended memory in an extended memory system by the computer shown in the method embodiment of accessing the extended memory by the computer.

A person of ordinary skill in the art may be aware that, in combination with the examples described in the embodiments disclosed in the present disclosure, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method performed by an extended memory controller for accessing an extended memory of a computer, the method comprising:
    receiving, from a processor system of the computer, a first memory access request for reading data stored in the extended memory, wherein the first memory access request comprises a first access address of the data;
    sending, to the processor system, in response to the first memory access request, and before obtaining the data from the extended memory, a first response message indicating that the extended memory controller has not obtained the data;
    receiving, from the processor system, after receiving the first memory access request, and after obtaining the data from the extended memory, a second memory access request comprising a second access address that is different from the first access address;
    making a determination that the first access address and the second access address correspond to a same physical address of the data; and
    sending the data to the processor system in response to the second memory access request and the determination.

2. The method of claim 1, further comprising:
    receiving, from the processor system before obtaining the data from the extended memory, a third memory access request comprising a third access address, wherein the third access address is different from the first access address and the second access address, and wherein the third access address corresponds to the physical address; and
    sending, to the processor system in response to the third memory access request, a third response message indicating that the extended memory controller has not obtained the data.

3. The method of claim 1, wherein the first access address comprises a first bank address and a first row address, wherein the second access address comprises the first bank address and a second row address, and wherein the first row address is different from the second row address.

4. The method of claim 1, further comprising creating a record in a data buffer, wherein the record comprises a tag field and a validity field, wherein the tag field corresponds to the physical address, and wherein, before receiving the data from the extended memory, the validity field indicates invalidity.

5. The method of claim 4, further comprising:
receiving the data from the extended memory;
storing, in response to receiving the data, the data in a data field of the record; and
setting, in response to storing the data, the validity field of the record to indicate validity.

6. An extended memory system comprising:
an extended memory; and
an extended memory controller coupled to the extended memory and configured to:
  receive, from a processor system of a computer, a first memory access request for reading data stored in the extended memory, wherein the first memory access request comprises a first access address of the data;
  send, to the processor system, in response to the first memory access request, and before obtaining the data from the extended memory, a first response message indicating that the extended memory controller has not obtained the data;
  receive, from the processor system, after receiving the first memory access request, and after obtaining the data from the extended memory, a second memory access request comprising a second access address that is different from the first access address;
  make a determination that the first access address and the second access address correspond to a same physical address of the data; and
  send the data to the processor system in response to the second memory access request and the determination.

7. The extended memory system of claim 6, wherein the extended memory controller is further configured to:
  receive, from the processor system before obtaining the data from the extended memory, a third memory access request comprising a third access address, wherein the third access address is different from the first access address and the second access address, and wherein the third access address corresponds to the physical address of the data; and
  send, to the processor system in response to the third memory access request, a third response message indicating that the extended memory controller has not obtained the data.

8. The extended memory system of claim 6, wherein the first access address comprises a first bank address and a first row address, wherein the second access address comprises the first bank address and a second row address, and wherein the first row address is different from the second row address.

9. The extended memory system of claim 6, wherein the extended memory controller is further configured to create a record in a data buffer, wherein the record comprises a tag field and a validity field, wherein the tag field corresponds to the physical address, and wherein, before the extended memory controller receives the data from the extended memory, the validity field indicates invalidity.

10. The extended memory system of claim 9, wherein the extended memory controller is further configured to:
  receive the data from the extended memory;
  store, in response to receiving the data, the data in a data field of the record; and
  set, in response to storing the data, the validity field of the record to indicate validity.

11. A computer system comprising:
an extended memory system comprising:
  an extended memory controller, and
  an extended memory configured to store data; and
a processor system coupled to the extended memory system and configured to:
  generate, according to a storage address of the data, N+1 memory access requests, wherein each of the N+1 memory access requests comprises a different access address corresponding to a same physical address of the data in the extended memory; and
  send the N+1 memory access requests to the extended memory controller for accessing the data from the extended memory.

12. The computer system of claim 11, wherein the extended memory controller is configured to:
  receive, from the processor system, a first memory access request of the N+1 memory access requests, wherein the first memory access request is for reading the data and comprises a first access address of the data;
  send, to the processor system, in response to the first memory access request, and before obtaining the data from the extended memory, a first response message indicating that the extended memory controller has not obtained the data;
  receive, from the processor system, after receiving the first memory access request, and after obtaining the data from the extended memory, a second memory access request of the N+1 memory access requests, wherein the second memory access request comprises a second access address that is different from the first access address;
  make a determination that the first access address and the second access address correspond to a physical address of the data; and
  send the data to the processor system in response to the second memory access request and the determination.

13. The computer system of claim 12, wherein the extended memory controller is further configured to:
  receive, from the processor system before obtaining the data from the extended memory, a third memory access request of the N+1 memory access requests, wherein the third memory access request comprises a third access address, wherein the third access address is different from the first access address and the second access address, and wherein the third access address corresponds to the physical address of the data; and
  send, to the processor system in response to the third memory access request, a third response message indicating that the extended memory controller has not obtained the data.

14. The computer system of claim 12, wherein the first access address comprises a first bank address and a first row address, wherein the second access address comprises the first bank address and a second row address, and wherein the first row address is different from the second row address.

15. The computer system of claim 12, wherein the extended memory controller is further configured to create a record in a data buffer, wherein the record comprises a tag field and a validity field, wherein the tag field corresponds to the physical address, and wherein, before the extended memory controller receives the data, the validity field indicates invalidity.

16. The computer system of claim 15, wherein the extended memory controller is further configured to:
  receive the data from the extended memory;
  store, in response to receiving the data, the data; and
  set, in response to storing the data, the validity field of the record to indicate validity.

17. The computer system of claim 11, wherein the processor system is further configured to determine N according to a delay parameter for obtaining the data from the extended memory, and wherein the delay parameter comprises a first delay (tPD1) of transmitting a memory access request from the extended memory controller to the extended memory, a second delay (tPD2) of transmitting the data accessed by the memory access request from the extended memory to the extended memory controller, or a time interval (T_Interval) between when the processor system sends two consecutive memory access requests.

18. The computer system of claim 17, wherein N is greater than or equal to a rounding of (tPD1+tPD2)/T_Interval.

19. The computer system of claim 17, wherein a value of the T_Interval corresponds to a delay for executing, by the processor system, a fence instruction between two consecutive memory access requests.

20. The computer system of claim 11, wherein the storage address is a virtual address, and wherein the processor system is further configured to:
    convert the storage address to a physical address; and
    generate N access addresses of the N+1 memory access requests according to the physical address,
    wherein the N access addresses comprise distinct row addresses for pointing to the physical address,
    wherein each distinct row address is based on different multiples of a quantity of memory rows in the extended memory in combination with a row address of the physical address, and
    wherein each of the N access addresses comprises a same bank address of the physical address and a different row address of the physical address to cause a row miss in the processor system.

* * * * *

UNITED STATES PATENT AND TRADEMARK OFFICE
CERTIFICATE OF CORRECTION

PATENT NO. : 11,237,728 B2  
APPLICATION NO. : 16/744795  
DATED : February 1, 2022  
INVENTOR(S) : Cui et al.

Page 1 of 1

It is certified that error appears in the above-identified patent and that said Letters Patent is hereby corrected as shown below:

On the Title Page

Item (72) Inventors: "Yuan Ruan, Beijinig (CN)" should read "Yuan Ruan, Beijing (CN)"

Item (56) References Cited, Foreign Patent Documents: "CN 104388436 A 1/2014" should read "CN 103488436 A 1/2014"

Signed and Sealed this  
Twenty-second Day of August, 2023

Katherine Kelly Vidal  
*Director of the United States Patent and Trademark Office*